United States Patent
Oishi et al.

(10) Patent No.: US 11,341,755 B2
(45) Date of Patent: May 24, 2022

(54) INFORMATION ACQUISITION APPARATUS

(71) Applicant: HONDA MOTOR CO., LTD., Tokyo (JP)

(72) Inventors: Yasuo Oishi, Tokyo (JP); Kazuya Matsuura, Tokyo (JP); Akira Iihoshi, Tokyo (JP); Takeo Tokunaga, Tokyo (JP); Atsuki Kakinuma, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 16/832,582

(22) Filed: Mar. 27, 2020

(65) Prior Publication Data

US 2020/0311444 A1     Oct. 1, 2020

(30) Foreign Application Priority Data

Mar. 29, 2019   (JP) .............................. JP2019-068238

(51) Int. Cl.
*G06V 20/56*   (2022.01)
*G06K 9/62*    (2022.01)

(52) U.S. Cl.
CPC ......... *G06V 20/588* (2022.01); *G06K 9/6288* (2013.01)

(58) Field of Classification Search
CPC ............. G06K 9/00798; G06K 9/6288; G06K 9/00791; G06K 9/00805; G06K 9/6218; G06K 9/3233; G06K 9/00818; G06K 9/00845; G06K 9/6262; G08G 1/0112; G08G 1/0125; G08G 1/0137; G08G 1/16; G08G 1/0129; G08G 1/0104; G08G 1/20; G08G 1/005; G08G 1/0962; G08G 1/0967; G08G 1/0969; G08G 1/166; G08G 1/205; G08G 1/075; G08G 1/162; G08G 1/164;
(Continued)

(56) References Cited

U.S. PATENT DOCUMENTS 9,971,946 B2    5/2018  Ito
10,503,983 B2  12/2019  Shimotani et al.
(Continued)

FOREIGN PATENT DOCUMENTS

JP    2018-021375 A    2/2018
JP    2018-181034 A   11/2018
WO    2017/029734 A1   2/2017

OTHER PUBLICATIONS

Office Action dated Feb. 2, 2021 issued over the corresponding Japanese Patent Application 2019-068238 with the English thereof.
(Continued)

*Primary Examiner* — Nimesh Patel
(74) *Attorney, Agent, or Firm* — Carrier Blackman & Associates, P.C.; Joseph P. Carrier; Jeffrey T. Gedeon

(57) ABSTRACT

An information acquisition apparatus provided in a moving object (vehicle) that moves on a road includes: a storage unit that records therein information about the road that is acquired based on movement of the moving object on the road; a determination unit that determines the type of the road on which the moving object moves and determines whether the road is of a predetermined type defined in association with the type of the moving object; and an identifying unit that identifies the information about the road acquired based on the movement of the moving object on the road of the predetermined type and recorded in the storage unit.

14 Claims, 11 Drawing Sheets

(58) Field of Classification Search
CPC .. G08G 1/012; G08G 1/052; G08G 1/096827; G08G 1/096844; G07C 5/008; G07C 5/0841; G07C 5/085; G07C 5/0808; G07C 5/0825; G07C 5/0866; G07C 5/0816; G07C 5/08; G07C 5/0891; G01N 21/8851; E01C 23/01; G06F 16/29; G06F 16/22; G06F 16/587; G06F 16/51; G06F 11/3089; G06F 2209/509; G06F 30/20; G06Q 50/26; H04W 4/02; H04W 4/40; H04W 4/021; H04W 4/029; H04W 4/027; H04W 4/48; H04W 4/024; H04W 4/46; H04W 4/70; G06N 20/00; G06N 7/005; G06N 3/08; G06N 5/02; B60T 2201/08; B60T 2201/022; B60T 2260/04; B60T 7/12; B60T 7/22; B60T 8/171; G06V 20/588; G06V 20/56

See application file for complete search history.

(56) References Cited

U.S. PATENT DOCUMENTS

| | | | |
|---|---|---|---|
| 2009/0160675 A1* | 6/2009 | Piccinini | G08G 1/127 340/905 |
| 2010/0019880 A1* | 1/2010 | Huang | G07C 5/085 340/5.1 |
| 2017/0371337 A1* | 12/2017 | Ramasamy | G01C 21/32 |
| 2018/0075309 A1* | 3/2018 | Sathyanarayana | G05D 1/0055 |
| 2018/0195973 A1* | 7/2018 | Yonekawa | G01N 21/8851 |
| 2020/0160068 A1* | 5/2020 | Silver | G01C 21/3833 |
| 2020/0240795 A1* | 7/2020 | Nomura | G01J 5/00 |

OTHER PUBLICATIONS

Office Action dated Sep. 8, 2021 issued over the corresponding Indian Patent Application No. 202044013484.

* cited by examiner

| NARROW ROAD<br>(WIDTH < THRESHOLD)<br>(WITHOUT CENTER DIVIDER)<br>(MAXIMUM SPEED = FIRST SPEED) | WIDE ROAD<br>(WIDTH ≧ THRESHOLD)<br>(WITH CENTER DIVIDER)<br>(MAXIMUM SPEED = SECOND SPEED) |
|---|---|
| TWO-WHEEL VEHICLE | FOUR OR MORE-WHEEL VEHICLE |

FIG. 3

| DAYTIME (7:00 TO 19:00) | NIGHT TIME (19:00 TO 7:00) |
|---|---|
| PRIVATE VEHICLE | COMMERCIAL VEHICLE |

|  | NARROW ROAD (WIDTH < THRESHOLD) (WITHOUT CENTER DIVIDER) (MAXIMUM SPEED = FIRST SPEED) | WIDE ROAD (WIDTH ≧ THRESHOLD) (WITH CENTER DIVIDER) (MAXIMUM SPEED = SECOND SPEED) |
|---|---|---|
| DAYTIME (7:00 TO 19:00) | BICYCLE | PRIVATE VEHICLE |
| NIGHT TIME (19:00 TO 7:00) | MOTORCYCLE | COMMERCIAL VEHICLE |

INFORMATION ACQUISITION APPARATUS

CROSS-REFERENCE TO RELATED APPLICATION

This application is based upon and claims the benefit of priority from Japanese Patent Application No. 2019-068238 filed on Mar. 29, 2019, the contents of which are incorporated herein by reference.

BACKGROUND OF THE INVENTION

Field of the Invention

The present invention relates to an information acquisition apparatus that is provided in a moving object moving on a road and acquires information about the road.

Description of the Related Art

Japanese Laid-Open Patent Publication No. 2018-021375 discloses an apparatus that captures an image of a road using a camera installed in a vehicle and analyzes cracks and the like on the road based on the image.

SUMMARY OF THE INVENTION

The apparatus disclosed in Japanese Laid-Open Patent Publication No. 2018-021375 collects images by traveling of dedicated vehicles for capturing images of road surfaces. Since this apparatus needs to make a vehicle travel for each region to collect road surface information of a wide range, the collection of images takes time and effort. Instead of this apparatus, it is possible to collect images from general vehicles that capture the image of the road surface via drive recorders or the like while traveling on the road, and analyze the collected images.

However, when images and sensor values of vehicles are collected unlimitedly from general vehicles, the amount of information becomes enormous, thereby making it difficult to process and store the information. Accordingly, it is desirable to collect carefully selected information.

The present invention addresses such problems, and has an object to provide an information acquisition apparatus capable of appropriately selecting information to be acquired when a road is analyzed based on information acquired by a camera and a sensor installed in a vehicle.

According to an aspect of the present invention, there is provided an information acquisition apparatus to be provided in a moving object that moves on a road. The information acquisition apparatus includes: a storage unit configured to record therein information about the road, the information being acquired based on movement of the moving object on the road; a determination unit configured to determine a type of the road on which the moving object moves and determine whether the road is of a predetermined type defined in association with a type of the moving object; and an identifying unit configured to identify the information about the road acquired based on the movement of the moving object on the road of the predetermined type and recorded in the storage unit.

According to the present invention, information used for analysis of a road can be selected appropriately.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a schematic view illustrating a first table;

FIG. 3 is a schematic view illustrating a second table;

FIG. 4 is a schematic view illustrating a third table;

DESCRIPTION OF THE PREFERRED EMBODIMENTS

An information acquisition apparatus according to the present invention will be described in details below by adopting preferable embodiments with reference to the drawings.

1. Road Management System 10

Figure 1:
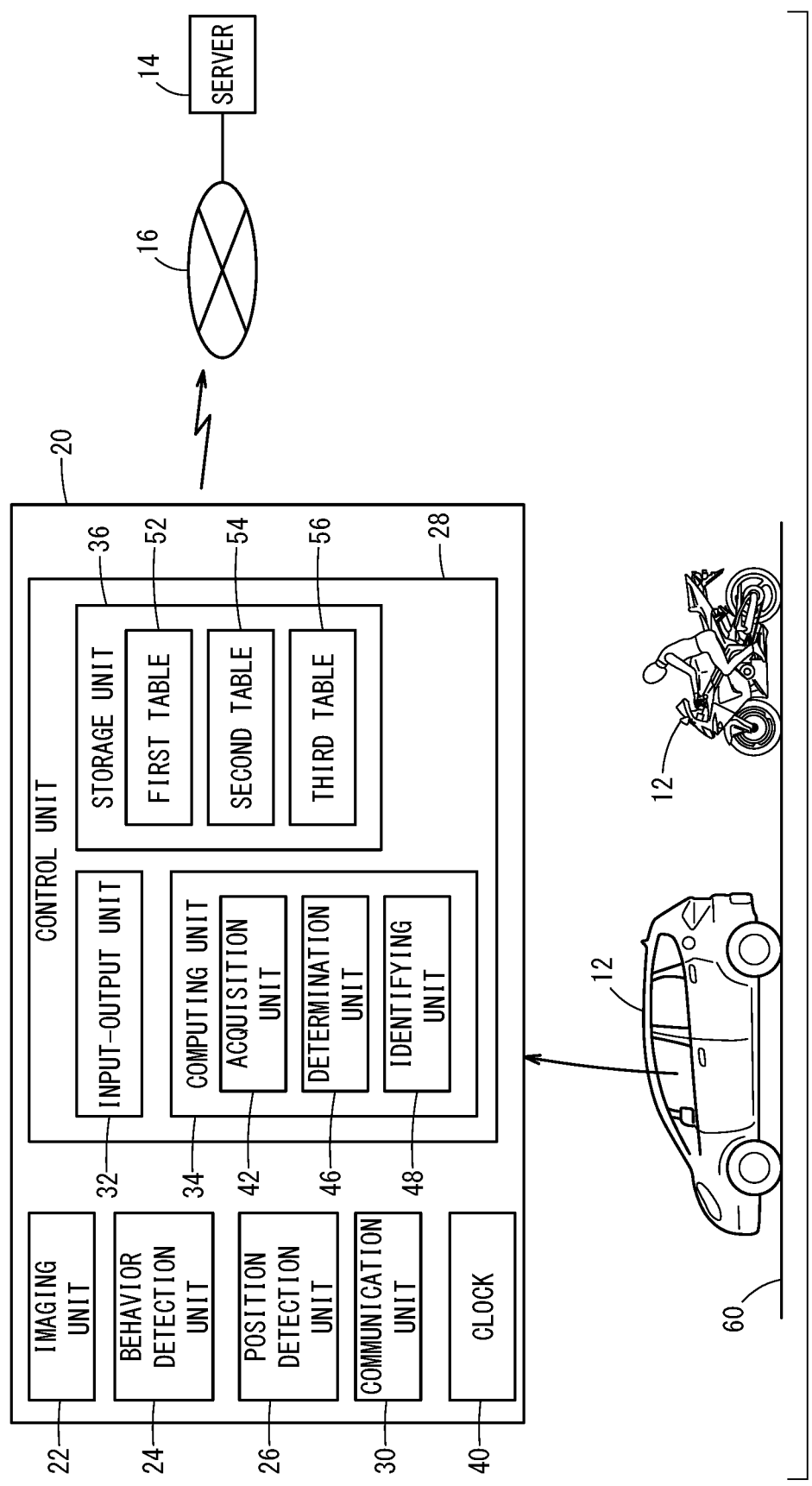
FIG. 1 is a structural diagram illustrating an information acquisition apparatus according to an embodiment.

As illustrated in FIG. 1, a road management system 10 includes a vehicle 12 (moving object), a server 14, and a public line 16. The server 14 is a computer, and a processor therein analyzes a road 60 using the information collected from the vehicles 12. For example, the server 14 makes analysis of infrastructures, such as whether holes, obstacles, or cracks are present on the road surface or whether breakage is present in structures. In addition, the server 14 can also analyze congestion on sidewalks, for example, the number of foot passengers and queues (for example, queues for shops along the road).

2. Vehicle 12

In this specification, the vehicle 12 includes a vehicle 12 with an engine or a vehicle 12 without an engine. The vehicle 12 is provided with an information acquisition apparatus 20 according to the embodiment. The information acquisition apparatus 20 may be achieved as an in-vehicle apparatus or a terminal device (such as a smartphone) carried by the user of the vehicle 12. Special application software for achieving the function of the information acquisition apparatus 20 is preinstalled in the terminal device.

3. Structure of the Information Acquisition Apparatus 20

The information acquisition apparatus 20 includes an imaging unit 22, a behavior detection unit 24, a position detection unit 26, a control unit 28, a communication unit 30, and a clock 40.

The imaging unit 22 is a camera and captures images of surroundings of the vehicle 12. The imaging unit 22 outputs image information to the control unit 28. The behavior detection unit 24 is, for example, a wheel speed sensor, an inclination sensor, or the like and detects the behavior information of the vehicle 12. The behavior detection unit 24 outputs the detected information to the control unit 28. The position detection unit 26 is, for example, a navigation apparatus and detects the position of the vehicle 12. The position detection unit 26 outputs position information indicating the detected position to the control unit 28. In addition, the position detection unit 26 identifies the road information of the detected position based on map information and outputs the identified road information to the control unit 28. The road information includes information such as the road width, the presence or absence of a center divider, and the maximum speed (speed limit).

The control unit 28 includes an ECU. The control unit 28 includes an input-output unit 32, a computing unit 34, and a storage unit 36. The input-output unit 32 includes an analog-to-digital conversion circuit, a communication interface, a driver, and the like.

The computing unit 34 includes a processor having, for example, a CPU and the like. The computing unit 34 achieves various functions by executing programs stored in the storage unit 36. In the embodiment, the computing unit 34 functions as an acquisition unit 42, a determination unit 46, and an identifying unit 48.

When the vehicle 12 moves on the road 60, the acquisition unit 42 acquires information about the road 60 and outputs the acquired information to the storage unit 36. Although two types of information including image information output by the imaging unit 22 and behavior information output by the behavior detection unit 24 are illustrated as information about the road 60 in the embodiment, other types of information may be included. In addition, when outputting the acquired information (information about the road 60) to the storage unit 36, the acquisition unit 42 establishes association between position information and road information about the position in which the information has been acquired, time information indicating the time at which the information has been acquired, and vehicle information stored in the storage unit 36 in advance.

The determination unit 46 determines the type of the road 60 on which the vehicle 12 moves and determines whether the road 60 on which the vehicle 12 moves is of a predetermined type defined in association with the type of the vehicle 12, based on a first table 52 or a third table 56 stored in the storage unit 36. Alternatively, the determination unit 46 determines the time at which the vehicle 12 moves and determines whether the time at which the vehicle 12 moves is included in a predetermined time period of the day defined in association with the type of the vehicle 12, based on a second table 54 or the third table 56 stored in the storage unit 36.

The identifying unit 48 identifies the information about the road 60 acquired based on the movement of the vehicle 12 on the road 60 of the predetermined type and recorded (stored) in the storage unit 36. Alternatively, the identifying unit 48 identifies the information about the road 60 acquired based on the movement of the vehicle 12 on the road 60 in the predetermined time period of the day and recorded in the storage unit 36. In addition, the identifying unit 48 outputs the identified information about the road 60 to the communication unit 30.

The storage unit 36 includes memories such as a RAM and a ROM. The storage unit 36 stores various programs, numerical information used in the processing performed by the computing unit 34, and the like. The storage unit 36 records (stores) therein the information about the road 60 acquired by the acquisition unit 42 based on the movement of the vehicle 12 on the road 60. In addition, the storage unit 36 stores one or some of the first table 52, the second table 54, and the third table 56 illustrated in FIGS. 2 to 4, respectively. Furthermore, the storage unit 36 stores vehicle information indicating the type of the vehicle 12 (here, whether the vehicle 12 is the two-wheel vehicle 12 or the four or more-wheel vehicle 12). Furthermore, when the vehicle 12 is the two-wheel vehicle 12, the storage unit 36 stores vehicle information indicating whether the vehicle 12 is a bicycle or a motorcycle. Alternatively, when the vehicle 12 is the four or more-wheel vehicle 12, the storage unit 36 stores vehicle information indicating whether the vehicle 12 is a private vehicle or a commercial vehicle.

The communication unit 30 is a communication terminal device, transmits the information output from the control unit 28 (identifying unit 48) to the server 14 via the public line 16, and receives the information transmitted from the server 14 and outputs the received information to the control unit 28.

4. First to Third Tables

The first table 52 illustrated in FIG. 2 defines the association between the types of the road 60 (predetermined road 60) and the types of the vehicle 12 strongly related to each other. In the first table 52, the types of the road 60 are classified based on whether the road 60 is wide or narrow. For example, the types of the road 60 are classified into the road 60 with a width less than a predetermined threshold and the road 60 with a width equal to or more than the predetermined threshold. Alternatively, the types of the road 60 may be classified into the road 60 without a center divider and the road 60 with a center divider. Alternatively, the types of the road 60 may be classified into the road 60 with the maximum speed (speed limit) equal to the first speed and the road 60 with the maximum speed equal to the second speed (>first speed). In addition, in the first table 52, the types of the vehicle 12 are classified based on whether the number of wheels is large or small. For example, the types of the vehicle 12 are classified into the two-wheel vehicle 12 and the four or more-wheel vehicle 12. The first table 52 associates the narrow road 60 with the two-wheel vehicle 12 and associates the wide road 60 with the four or more-wheel vehicle 12.

The second table 54 illustrated in FIG. 3 defines the association between the time periods of the day (predetermined time periods of the day) and the types of the vehicle 12 strongly related to each other. In the second table 54, the time periods of the day are classified into daytime and night time. For example, the time periods of the day are classified into a particular time period of the day (7:00 to 19:00) including 12:00 and a particular time period of the day (19:00 to 7:00) including 0:00. The information of time period of the day may be updated as needed by acquiring the time of sunrise and the time of sunset from public information. In addition, in the second table 54, the types of the vehicle 12 are classified based on whether the vehicle 12 is a general vehicle 12 or a commercial vehicle 12. For example, the types of the vehicle 12 are classified into a private vehicle and a commercial vehicle. The commercial vehicle here includes a cargo transport vehicle such as a truck, and a passenger transport vehicle such as a taxi or bus.

The second table 54 associates daytime with a private vehicle and associates night time with a commercial vehicle.

The third table 56 illustrated in FIG. 4 is acquired by combining the first table 52 with the second table 54, and defines the association between the types of the road 60, the time periods of the day, and the types of the vehicle 12. The third table 56 establishes association between the narrow road 60, daytime, and a bicycle, and further establishes association between the narrow road 60, night time, and a motorcycle. In addition, the third table 56 establishes association between the wide road 60, daytime, and a private vehicle and further establishes association between the wide road 60, night time, and a commercial vehicle.

5. Processing Performed by the Information Acquisition Apparatus 20

5.1. Information Acquisition Processing

Examples of information acquisition processing performed by the information acquisition apparatus 20 will be described below as first to sixth embodiments. The first to third embodiments are processing for recording the information about the road 60 in the storage unit 36 when the road 60 on which the vehicle 12 travels is of a predetermined type or when the time at which the vehicle 12 travels is included in a predetermined time period of the day. In contrast, the fourth to sixth embodiments are processing for constantly recording the information about the road 60 in the storage unit 36, and adding a flag (identification information) to the information to be recorded when the road 60 on which the vehicle 12 travels is of a predetermined type or when the time at which the vehicle 12 travels is included in a predetermined time period of the day.

5.1.1. First Embodiment

Information acquisition processing according to the first embodiment will be described with reference to FIG. 5. The first embodiment is an information acquisition processing that uses the first table 52 illustrated in FIG. 2. A series of processes described below is performed at predetermined intervals.

In step S1, the acquisition unit 42 determines whether the vehicle 12 is traveling. For example, the acquisition unit 42 determines whether the vehicle 12 is traveling by determining the travel amount of the vehicle 12 per predetermined unit time based on the position information detected by the position detection unit 26. Alternatively, the acquisition unit 42 determines whether the vehicle 12 is traveling based on the behavior information (such as the travel speed) detected by the behavior detection unit 24. When the vehicle 12 is traveling (YES in step S1), the processing proceeds to step S2. On the other hand, when the vehicle 12 is not traveling (NO in step S1), the processing proceeds to step S5.

In step S2, the determination unit 46 determines the type of the road 60 on which the vehicle 12 is traveling. For example, the determination unit 46 determines the type of the road 60 (here, whether the road 60 is a wide road 60 or a narrow road 60) by determining the width, the presence or absence of a center divider, the maximum speed, and the like of the road 60 on which the vehicle 12 is moving based on the image information output by the imaging unit 22 or the road information output by the position detection unit 26. Upon completion of step S2, the processing proceeds to step S3.

In step S3, the determination unit 46 determines whether the road 60 is of a predetermined type defined in association with the type of the vehicle 12. Here, the determination unit 46 performs one or both of first processing and second processing described below by using the first table 52.

In the first processing, the determination unit 46 sets, by using the first table 52, the type of the road 60 (narrow or wide) associated with the type of the vehicle 12 (two-wheel vehicle, or four or more-wheel vehicle) stored as vehicle information in the storage unit 36. Next, the determination unit 46 determines whether the set type of the road 60 (narrow or wide) coincides with the type of the road 60 (narrow or wide) determined in step S2. When the types of the road 60 coincide with each other, the determination unit 46 determines that the road 60 is of the predetermined type defined in association with the type of the vehicle 12. On the other hand, when the types of the road 60 do not coincide with each other, the determination unit 46 determines that the road 60 is not of the predetermined type defined in association with the type of the vehicle 12.

In the second processing, the determination unit 46 sets, by using the first table 52, the type of the vehicle 12 (two-wheel vehicle, or four or more-wheel vehicle) associated with the type of the road 60 (narrow or wide) determined in step S2. Next, the determination unit 46 determines whether the set type of the vehicle 12 (two-wheel vehicle or four or more-wheel vehicle) coincides with the type of the vehicle 12 (two-wheel vehicle or four or more-wheel vehicle) stored as vehicle information in the storage unit 36. When the types of the vehicle 12 coincide with each other, the determination unit 46 determines that the road 60 is of the predetermined type defined in association with the type of the vehicle 12. On the other hand, when the types of the vehicle 12 do not coincide with each other, the determination unit 46 determines that the road 60 is not of the predetermined type defined in association with the type of the vehicle 12.

When the road 60 is of the predetermined type defined in association with the type of the vehicle 12 (YES in step S3), the processing proceeds to step S4. On the other hand, when the road 60 is not of the predetermined type defined in association with the type of the vehicle 12 (NO in step S3), the processing proceeds to step S5.

In step S4, the acquisition unit 42 outputs information (image information, behavior information, and information acquired by processing image information and behavior information, which are referred to below as image information and the like) about the road 60 to the storage unit 36. The storage unit 36 records the information (image information and the like) about the road 60 acquired based on the movement of the vehicle 12 on the road 60.

In step S5, the acquisition unit 42 does not output the information (image information and the like) about the road 60 to the storage unit 36. In this case, the storage unit 36 does not record the information (image information and the like) about the road 60 acquired based on the movement of the vehicle 12 on the road 60.

5.1.2. Second Embodiment

Information acquisition processing according to the second embodiment will be described with reference to FIG. 6. The second embodiment is an information acquisition processing that uses the second table 54 illustrated in FIG. 3. The processing in step S11, the processing in step S14, and the processing in step S15 illustrated in FIG. 6 are the same as the processing in step S1, the processing in step S4, and the processing in step S5 illustrated in FIG. 5, respectively. The processing in step S12 and step S13 will be described below.

In step S12, the determination unit 46 determines the current time (time at that moment). For example, the determination unit 46 determines the current time based on the time indicated by the clock 40. Upon completion of step S12, the processing proceeds to step S13.

In step S13, the determination unit 46 determines whether the time is included in the predetermined time period of the day defined in association with the type of the vehicle 12. Here, the determination unit 46 performs one or both of the first processing and the second processing described below by using the second table 54.

In the first processing, the determination unit 46 sets, by using the second table 54, the time period of the day (daytime or night time) associated with the type of the vehicle 12 (private vehicle or commercial vehicle) stored as vehicle information in the storage unit 36. Next, the determination unit 46 determines whether the time determined in step S12 is included in the set time period of the day (daytime or night time). When the time determined in step S12 is included in the set time period of the day, the determination unit 46 determines that the time is included in the predetermined time period of the day defined in association with the type of the vehicle 12. On the other hand, when the time determined in step S12 is not included in the set time period of the day, the determination unit 46 determines that the time is not included in the predetermined time period of the day defined in association with the type of the vehicle 12.

In the second processing, the determination unit 46 sets, by using the second table 54, the type of the vehicle 12 (private vehicle or commercial vehicle) associated with the time period of the day (daytime or night time) that includes the time determined in step S12. Next, the determination unit 46 determines whether the set type of the vehicle 12 (private vehicle or commercial vehicle) coincides with the type of the vehicle 12 (private vehicle or commercial vehicle) stored as vehicle information in the storage unit 36. When the types of the vehicle 12 coincide with each other, the determination unit 46 determines that the time is included in the predetermined time period of the day defined in association with the type of the vehicle 12. On the other hand, when the types of the vehicle 12 do not coincide with each other, the determination unit 46 determines that the time is not included in the predetermined time period of the day defined in association with the type of the vehicle 12.

When the time is included in the predetermined time period of the day defined in association with the type of the vehicle 12 (YES in step S13), the processing proceeds to step S14. On the other hand, when the time is not included in the predetermined time period of the day defined in association with the type of the vehicle 12 (NO in step S13), the processing proceeds to step S15.

5.1.3. Third Embodiment

Figure 6:
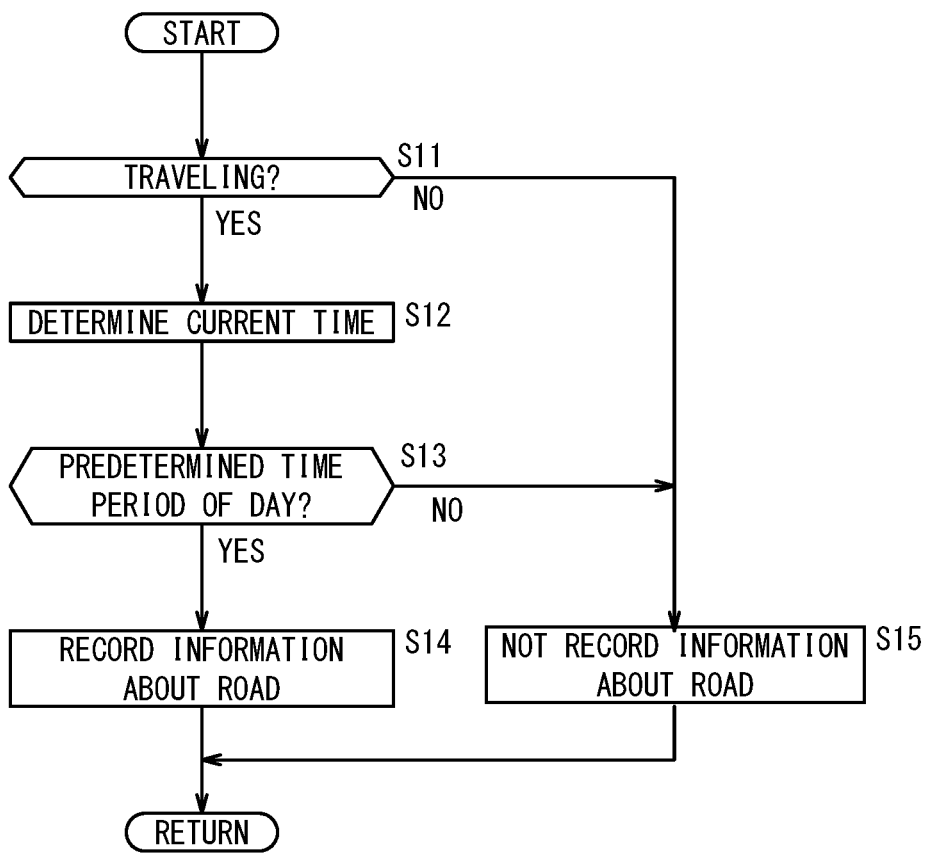
FIG. 6 is a flowchart illustrating information acquisition processing according to a second embodiment.
Figure 7:
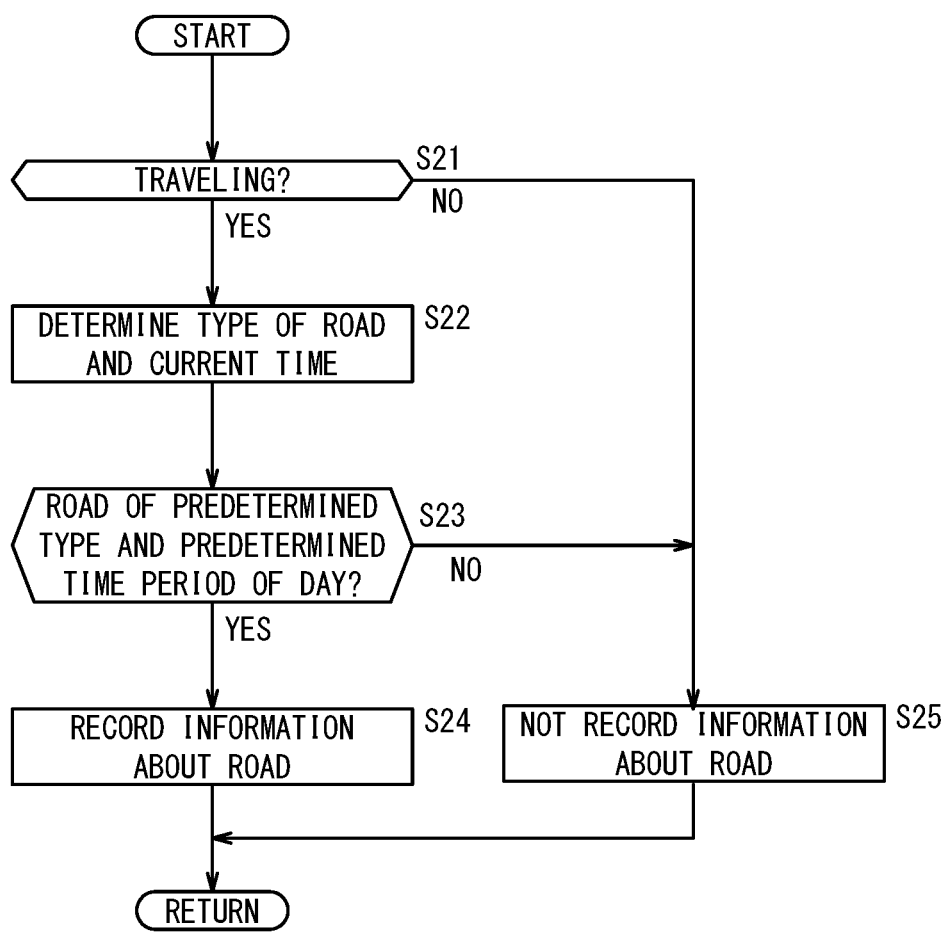
FIG. 7 is a flowchart illustrating information acquisition processing according to a third embodiment.

Information acquisition processing according to the third embodiment will be described with reference to FIG. 7. The third embodiment is an information acquisition processing that uses the third table 56 illustrated in FIG. 4. The processing in step S21, the processing in step S24, and the processing in step S25 illustrated in FIG. 7 are the same as the processing in step S1, the processing in step S4, and the processing in step S5 illustrated in FIG. 5, respectively. In addition, the processing in step S22 illustrated in FIG. 7 is obtained by combining the processing in step S2 illustrated in FIG. 5 with the processing in step S12 illustrated in FIG. 6. The processing in step S23 will be described below.

In step S23, the determination unit 46 determines whether the road 60 is of a predetermined type defined in association with the type of the vehicle 12 and whether the time is included in a predetermined time period of the day defined in association with the type of the vehicle 12. Here, the determination unit 46 performs one or both of the first processing and second processing described below by using the third table 56.

In the first processing, the determination unit 46 sets, by using the third table 56, the type of the road 60 (narrow or wide) and the time period of the day (daytime or night time) associated with the type of the vehicle 12 (bicycle, motorcycle, private vehicle, or commercial vehicle) stored as vehicle information in the storage unit 36. Next, the determination unit 46 determines whether the set type of the road 60 (narrow or wide) coincides with the type of the road 60 (narrow or wide) determined in step S22. In addition, the determination unit 46 determines whether the time determined in step S22 is included in the set time period of the day (daytime or night time). When the types of the road 60 coincide with each other and the time determined in step S22 is included in the set time period of the day, the determination unit 46 determines that the road 60 is of the predetermined type defined in association with the type of the vehicle 12 and the time is included in the predetermined time period of the day defined in association with the type of the vehicle 12. On the other hand, when the types of the road 60 do not coincide with each other or the time determined in step S22 is not included in the set time period of the day, the determination unit 46 determines that the road 60 is not of the predetermined type defined in association with the type of the vehicle 12 or the time is not included in the predetermined time period of the day defined in association with the type of the vehicle 12.

In the second processing, the determination unit 46 sets, by using the third table 56, the type of the vehicle 12 (bicycle, motorcycle, private vehicle, or commercial vehicle) associated with the type of the road 60 (narrow or wide) determined in step S22 and the time period of the day (daytime or night time) that includes the time determined in step S22. Next, the determination unit 46 determines whether the set type of the vehicle 12 (bicycle, motorcycle, private vehicle, or commercial vehicle) coincides with the type of the vehicle 12 (bicycle, motorcycle, private vehicle, or commercial vehicle) stored as vehicle information in the storage unit 36. When the types of the vehicle 12 coincide with each other, the determination unit 46 determines that the road 60 is of the predetermined type defined in association with the type of the vehicle 12 and the time is included in the predetermined time period of the day defined in association with the type of the vehicle 12. On the other hand, when the types of the vehicle 12 do not coincide with each other, the determination unit 46 determines that the road 60 is not of the predetermined type defined in association with the type of the vehicle 12 or the time is not included in the predetermined time period of the day defined in association with the type of the vehicle 12.

When the road 60 is of the predetermined type defined in association with the type of the vehicle 12 and the time is included in the predetermined time period of the day defined in association with the type of the vehicle 12 (YES in step S23), the processing proceeds to step S24. On the other hand, when the road 60 is not of the predetermined type defined in association with the type of the vehicle 12 or the time is not included in the predetermined time period of the day defined in association with the type of the vehicle 12 (NO in step S23), the processing proceeds to step S25.

5.1.4. Fourth Embodiment

Figure 8:
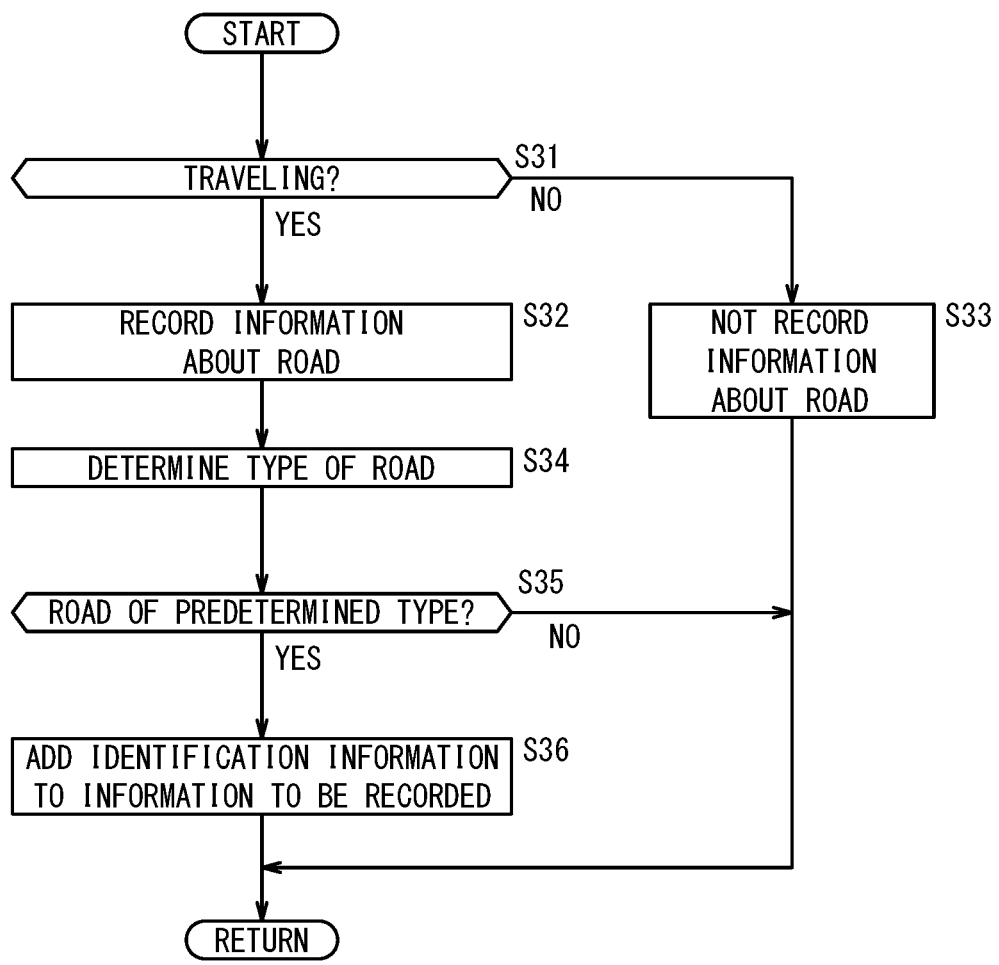
FIG. 8 is a flowchart illustrating information acquisition processing according to a fourth embodiment.

Information acquisition processing according to the fourth embodiment will be described with reference to FIG. 8. The fourth embodiment is an information acquisition processing that uses the first table 52 illustrated in FIG. 2. A series of processes described below is performed at predetermined intervals.

Figure 5:
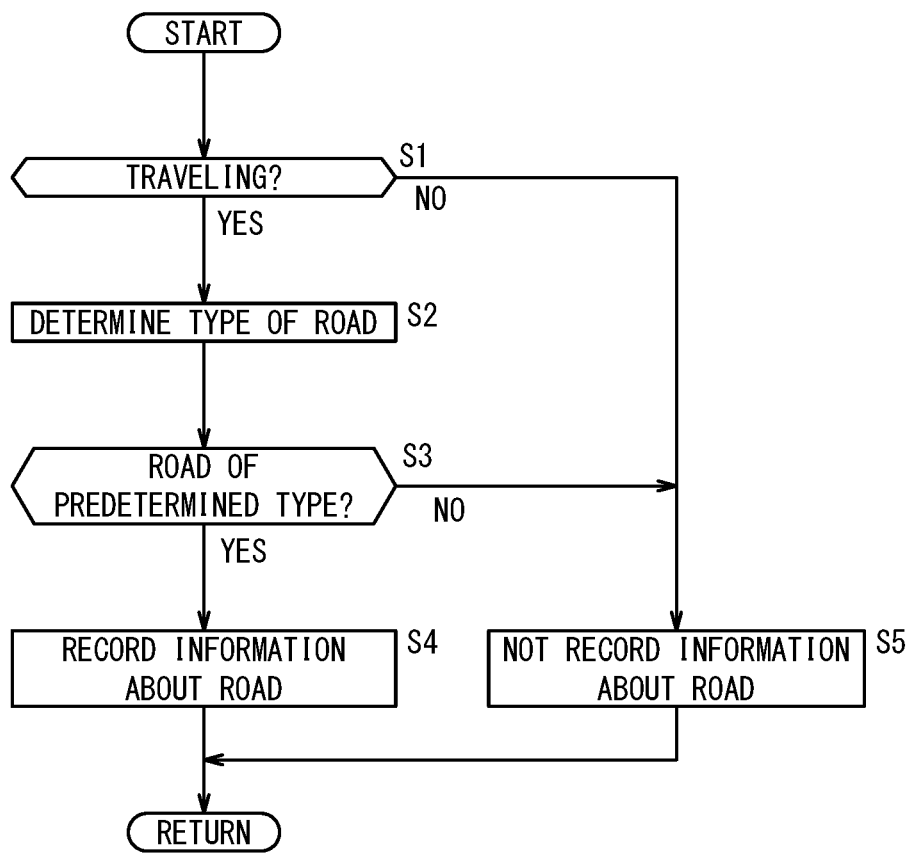
FIG. 5 is a flowchart illustrating information acquisition processing according to a first embodiment.

The processing in step S31 is the same as the processing in step S1 illustrated in FIG. 5. When the vehicle 12 is traveling (YES in step S31), the processing proceeds to step S32. On the other hand, when the vehicle 12 is not traveling (NO in step S31), the processing proceeds to step S33.

The processing in step S32 is the same as the processing in step S4 illustrated in FIG. 5. Upon completion of step S32, the processing proceeds to step S34.

The processing in step S33 is the same as the processing in step S5 illustrated in FIG. 5. Upon completion of step S33, the processing temporarily ends.

The processing in step S34 is the same as the processing in step S2 illustrated in FIG. 5. Upon completion of step S34, the processing proceeds to step S35.

The processing in step S35 is the same as the processing in step S3 illustrated in FIG. 5. When the road 60 is of the predetermined type defined in association with the type of the vehicle 12 (YES in step S35), the processing proceeds to step S36. On the other hand, when the road 60 is not of the predetermined type defined in association with the type of the vehicle 12 (NO in step S35), the processing temporarily ends.

In step S36, the acquisition unit 42 adds a flag (identification information) to the information (image information and the like) about the road 60 recorded in the storage unit 36 in step S32. The flag indicates that the information (image information and the like) recorded in the storage unit 36 in step S32 has been acquired by traveling of the vehicle 12 on the road 60 of the predetermined type defined in association with the type of the vehicle 12.

5.1.5. Fifth Embodiment

Figure 9:
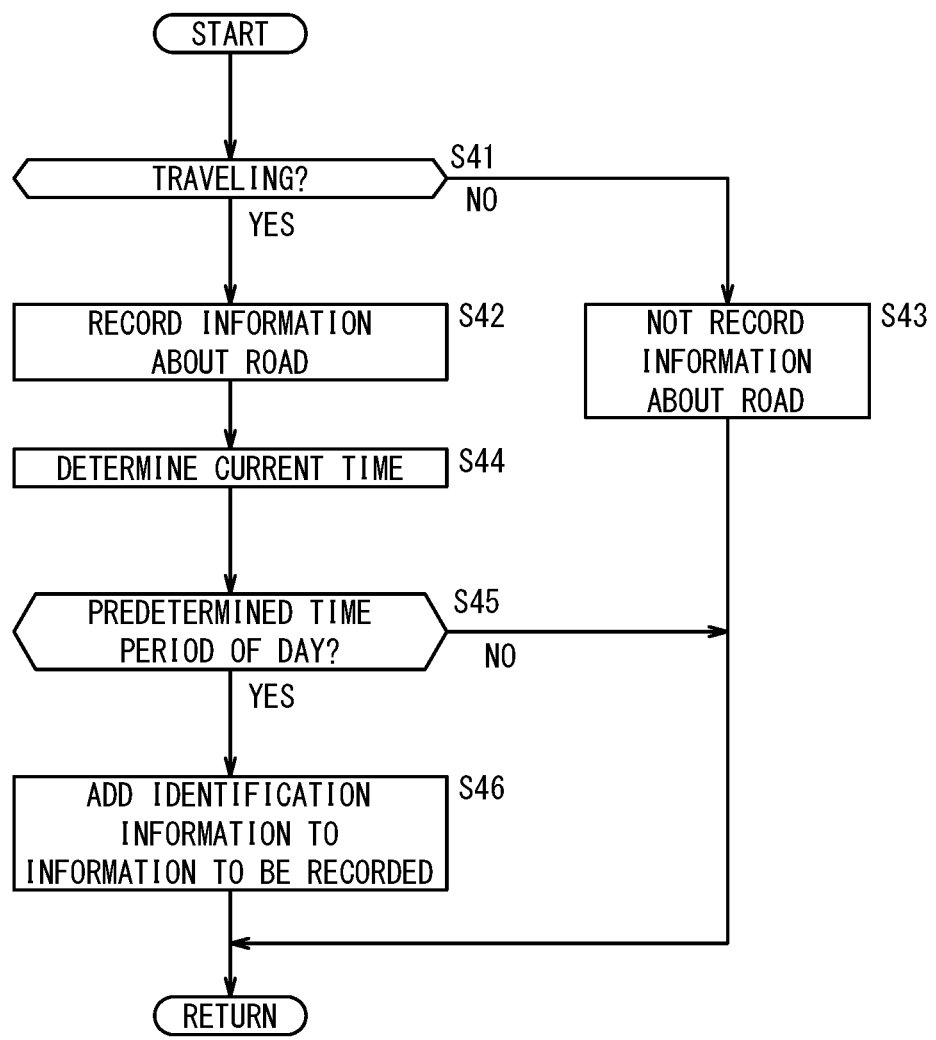
FIG. 9 is a flowchart illustrating information acquisition processing according to a fifth embodiment.

Information acquisition processing according to the fifth embodiment will be described with reference to FIG. 9. The fifth embodiment is an information acquisition processing that uses the second table 54 illustrated in FIG. 3. The processing in step S41, the processing in step S42, and the processing in step S43 illustrated in FIG. 9 are the same as the processing in step S31, the processing in step S32, and the processing in step S33 illustrated in FIG. 8, respectively.

The processing in step S44 is the same as the processing in step S12 illustrated in FIG. 6. Upon completion of step S44, the processing proceeds to step S45.

The processing in step S45 is the same as the processing in step S13 illustrated in FIG. 6. When the time is included in the predetermined time period of the day defined in association with the type of the vehicle 12 (YES in step S45), the processing proceeds to step S46. On the other hand, when the time is not included in the predetermined time period of the day defined in association with the type of the vehicle 12 (NO in step S45), the processing temporarily ends.

In step S46, the acquisition unit 42 adds a flag to the information (image information and the like) about the road 60 recorded in the storage unit 36 in step S42. The flag indicates that the information (image information and the like) recorded in the storage unit 36 in step S42 has been acquired by traveling of the vehicle 12 in the predetermined time period of the day defined in association with the type of the vehicle 12.

5.1.6. Sixth Embodiment

Figure 10:
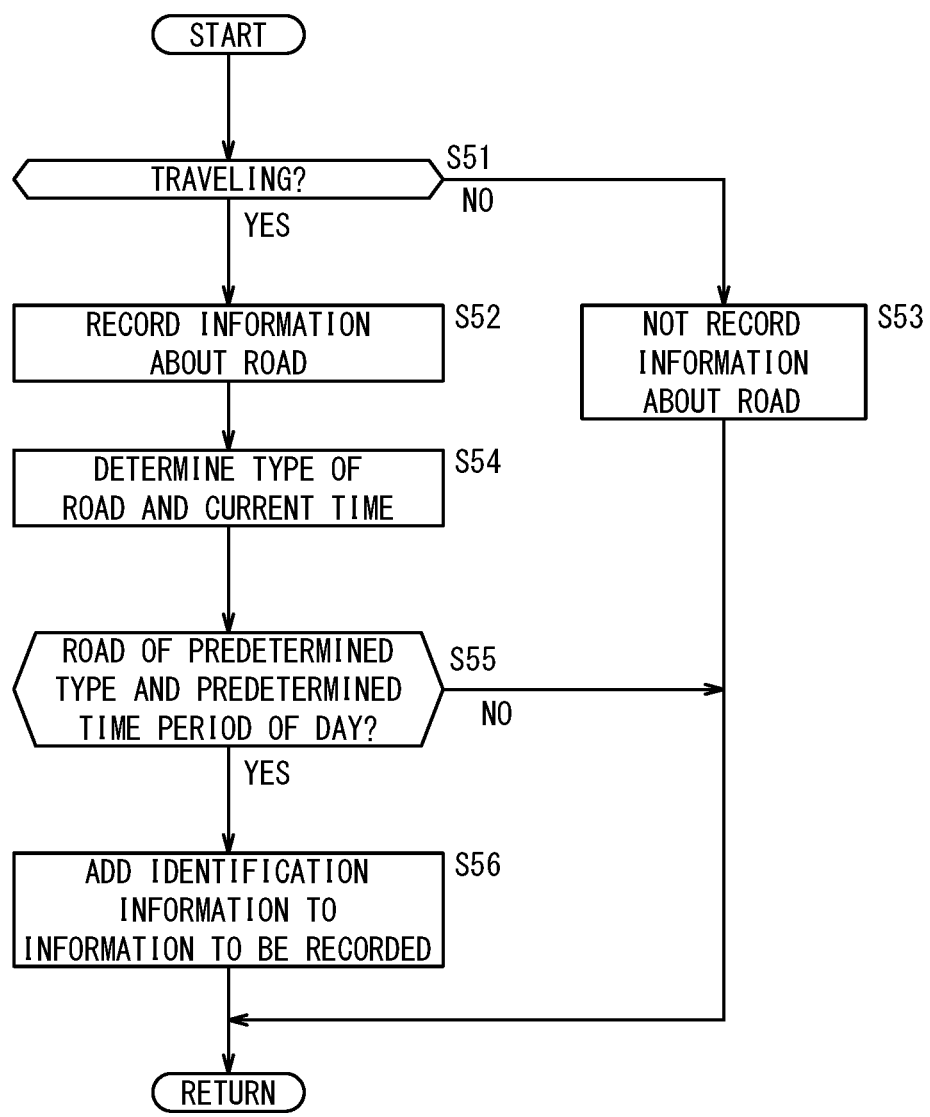
FIG. 10 is a flowchart illustrating information acquisition processing according to a sixth embodiment.

Information acquisition processing according to the sixth embodiment will be described with reference to FIG. 10. The sixth embodiment is an information acquisition processing that uses the third table 56 illustrated in FIG. 4. The processing in step S51, the processing in step S52, and the processing in step S53 illustrated in FIG. 10 are the same as the processing in step S31, the processing in step S32, and the processing in step S33 illustrated in FIG. 8, respectively.

The processing in step S54 is the same as the processing in step S22 illustrated in FIG. 7. Upon completion of step S54, the processing proceeds to step S55.

The processing in step S55 is the same as the processing in step S23 illustrated in FIG. 7. When the road 60 is of the predetermined type defined in association with the type of the vehicle 12 and the time is included in the predetermined time period of the day defined in association with the type of the vehicle 12 (YES in step S55), the processing proceeds to step S56. On the other hand, when the road 60 is not of the predetermined type defined in association with the type of the vehicle 12 or the time is not included in the predetermined time period of the day defined in association with the type of the vehicle 12 (NO in step S55), the processing temporarily ends.

In step S56, the acquisition unit 42 adds a flag to the information (image information and the like) about the road 60 recorded in the storage unit 36 in step S52. The flag indicates that the information (image information and the like) recorded in the storage unit 36 in step S52 has been acquired by traveling of the vehicle 12 on the road 60 of the predetermined type defined in association with the type of the vehicle 12 in the predetermined time period of the day defined in association with the type of the vehicle 12.

5.2. Transmission Processing

Figure 11:
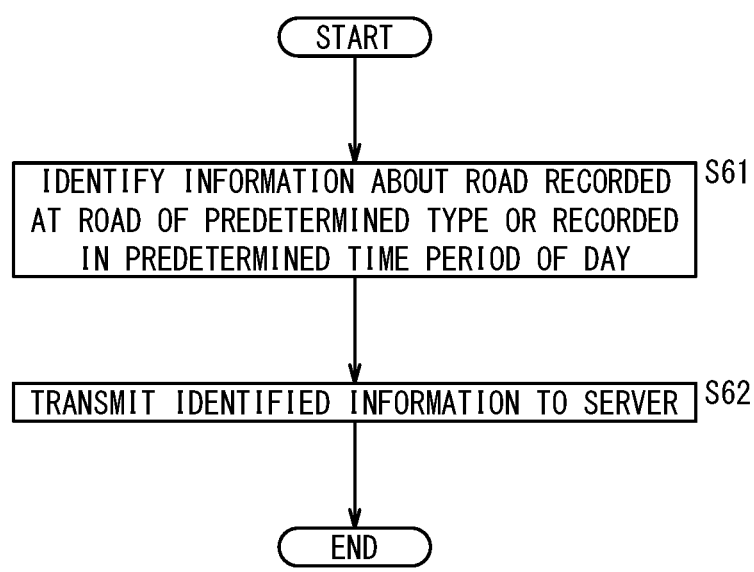
FIG. 11 is a flowchart illustrating transmission processing.

An example of transmission processing performed by the information acquisition apparatus 20 will be described with reference to FIG. 11. A series of processes described below may be performed at predetermined intervals or at any timing.

In step S61, the identifying unit 48 identifies the information (information about the road 60) recorded at the road 60 of a predetermined type or recorded in a predetermined time period of the day, as the information to be transmitted to the server 14, of the information (information about the road 60) recorded in the storage unit 36. In the first embodiment to the third embodiment, all pieces of the information recorded in the storage unit 36 is the information recorded by traveling of the vehicle 12 on the road 60 of the predetermined type or the information recorded by traveling of the vehicle 12 in the predetermined time period of the day. Accordingly, the identifying unit 48 reads all pieces of the information (information about the road 60) recorded in the storage unit 36 and outputs the read information to the communication unit 30. In contrast, in the fourth embodiment to the sixth embodiment, the information with a flag of the information recorded in the storage unit 36 is the information recorded by traveling of the vehicle 12 on the road 60 of the predetermined type or the information recorded by traveling of the vehicle 12 in the predetermined time period of the day. Accordingly, the identifying unit 48 reads only the information with a flag of all pieces of the information (information about the road 60) recorded in the storage unit 36 and outputs the read information to the communication unit 30. Upon completion of step S61, the processing proceeds to step S62.

In step S62, the communication unit 30 transmits the information identified by the identifying unit 48 to the server 14.

As described above, the server 14 can collect the information (information about the road 60) acquired by traveling of each of the vehicles 12 on the road 60 of the predetermined type defined in association with the type of the vehicle 12 or by traveling of the vehicle 12 in the predetermined time period of the day. Then, the server 14 can analyze the road 60 using the collected information.

6. Modifications

The information about the road 60 may be recorded temporarily in a storage medium carried in the vehicle 12. In this case, the server 14 can read the information about the road 60 from the recording medium.

Each time "the information about the road 60" is newly acquired and stored (recorded) in the storage unit 36 by continuous traveling of the vehicle 12 on the predetermined road 60 associated with the type of the vehicle 12, the identifying unit 48 may identify all pieces of the newly stored information. Alternatively, each time "the information about the road 60" is newly acquired and stored in the storage unit 36 by continuous traveling of the vehicle 12 in the time included in the predetermined time period of the day associated with the type of the vehicle 12, the identifying unit 48 may identify all pieces of the newly stored information. The communication unit 30 may transmit "the information about the road 60" newly identified by the identifying unit 48 by continuous traveling of the vehicle 12 to the server 14 as needed (for example, at the same time with the identification). In this case, the storage unit 36 may store "the information about the road 60" (temporarily, for example) in the predetermined storage region used for transmission to the server 14. In addition, the storage unit 36 may delete "the information about the road 60" from the storage region each time transmission to the server 14 is completed.

7. Technical Concept Acquired from the Embodiments

The technical concept that can be grasped from the embodiments described above will be described below.

According to an aspect of the present invention, there is provided the information acquisition apparatus 20 provided in the moving object (vehicle 12) that moves on the road 60. The information acquisition apparatus 20 includes: the storage unit 36 configured to record therein information about the road 60, the information being acquired based on movement of the moving object (vehicle 12) on the road 60; the determination unit 46 configured to determine a type of the road 60 on which the moving object (vehicle 12) moves and determine whether the road 60 is of a predetermined type defined in association with a type of the moving object (vehicle 12); and the identifying unit 48 configured to identify the information about the road 60 acquired based on the movement of the moving object (vehicle 12) on the road 60 of the predetermined type and recorded in the storage unit 36.

In the structure described above, since the information about the road 60 is acquired when the moving object (vehicle 12) moves on the predetermined road 60, the information used to analyze the road 60 can be selected appropriately.

In an aspect of the present invention, the storage unit 36 may record the information about the road 60 when the determination unit 46 determines that the road 60 is of the predetermined type defined in association with the type of the moving object (vehicle 12).

In the structure described above, by establishing in advance the association between the type of the road 60 and the type of the moving object (vehicle 12) strongly related to each other, the information used to analyze the road 60 can be selected more appropriately.

In an aspect of the present invention, the information acquisition apparatus 20 may further include the communication unit 30 configured to transmit the information about the road 60 identified by the identifying unit 48 to the server 14 provided outside the moving object (vehicle 12).

In the structure described above, the road 60 can be analyzed by the server 14.

In an aspect of the present invention, the communication unit 30 may transmit, to the server 14, only the information about the road 60 identified by the identifying unit 48 of the information about the road 60 recorded in the storage unit 36.

In an aspect of the present invention, the moving object (vehicle 12) may be the two-wheel vehicle 12, and the determination unit 46 may determine that the road 60 is of the predetermined type defined in association with the moving object (vehicle 12) when the road 60 has a width smaller than a predetermined threshold.

In an aspect of the present invention, the moving object (vehicle 12) may be the two-wheel vehicle 12, and the determination unit 46 may determine that the road 60 is of the predetermined type defined in association with the moving object (vehicle 12) when the road 60 does not have a center divider.

In an aspect of the present invention, the moving object (vehicle 12) may be the two-wheel vehicle 12, and the determination unit 46 may determine that the road 60 is of the predetermined type defined in association with the moving object (vehicle 12) when the road 60 has a maximum speed smaller than a predetermined speed.

In an aspect of the present invention, the moving object (vehicle 12) may be the four or more-wheel vehicle 12, and the determination unit 46 may determine that the road 60 is of the predetermined type defined in association with the moving object (vehicle 12) when the road 60 has a width larger than a predetermined threshold.

In an aspect of the present invention, the moving object (vehicle 12) may be the four or more-wheel vehicle 12, and the determination unit 46 may determine that the road 60 is of the predetermined type defined in association with the moving object (vehicle 12) when the road 60 has a center divider.

In an aspect of the present invention, the moving object (vehicle 12) may be the four or more-wheel vehicle 12, and the determination unit 46 may determine that the road 60 is of the predetermined type defined in association with the moving object (vehicle 12) when the road 60 has a maximum speed larger than a predetermined speed.

The information acquisition apparatus according to the present invention is not limited to the embodiments described above and it will be appreciated that various structures may be adopted without departing from the concept of the present invention.

What is claimed is:

1. An information acquisition apparatus provided in a moving object that moves on a road, the information acquisition apparatus comprising: a memory; and one or more processors that execute computer-executable instructions stored in the memory, wherein the memory is configured to record therein a table storing types of roads in association with types of moving objects, moving object information indicating a type of the moving object, and at least one of a predetermined threshold, by which roads are classified into a narrow road and a wide road, and a predetermined speed threshold, with which roads are classified, in the table, the narrow road, a road without a center divider, or a road having a maximum speed smaller than the predetermined speed threshold is associated with a two-wheel vehicle, and the wide road, a road with the center divider, or a road having a maximum speed larger than the predetermined speed threshold is associated with a four-wheel vehicle, and the one or more processors execute the computer-executable instructions to cause the information acquisition apparatus to:

determine a type of the road on which the moving object moves based on image information acquired by a camera installed in the moving object and indicating images of surroundings of the moving object, or on road information indicating a position of the moving object based on map information;

determine whether the type of the road as determined corresponds to a type of road stored in the table in association with the type of the moving object based on the moving object information;

record the image information in the memory when it is determined that the type of the road corresponds to the type of road stored in the table, identify the image information recorded in the memory as information that should be transmitted to a server provided outside the moving object; and transmit the image information recorded in the memory to the server.

2. The information acquisition apparatus according to claim 1, wherein the one or more processors execute the computer-executable instructions to cause the information acquisition apparatus to determine a width of the road based on the image information or the road information, and determine that the type of the road corresponds to the type of road stored in the table when the width of the road is classified into the narrow road using the predetermined threshold and the moving object information recorded in the memory indicates the two-wheel vehicle.

3. The information acquisition apparatus according to claim 1, wherein the one or more processors execute the computer-executable instructions to cause the information acquisition apparatus to determine whether the road on which the moving object moves is the road having no center divider based on the image information or the road information, and determine that the type of the road on which the moving object moves corresponds to the type of road stored in the table when the road does not have a center divider and the moving object information recorded in the memory indicates the two-wheel vehicle.

4. The information acquisition apparatus according to claim 1, wherein the one or more processors execute the computer-executable instructions to cause the information acquisition apparatus to determine the speed limit for the road on which the moving object moves based on the image information or the road information, and determine that the type of the road on which the moving object moves corresponds to the type of road stored in the table when the road has the maximum speed smaller than the predetermined speed and the moving object information recorded in the memory indicates the two-wheel vehicle.

5. The information acquisition apparatus according to claim 1, wherein the one or more processors execute the computer-executable instructions to cause the information acquisition apparatus to determine a width of the road based on the image information or the road information, and determine that the type of the road corresponds to the type of road stored in the table when the width of the road is classified into the wide road using the predetermined threshold and the moving object information recorded in the memory indicates the four or more-wheel vehicle.

6. The information acquisition apparatus according to claim 1, wherein the one or more processors execute the computer-executable instructions to cause the information acquisition apparatus to determine whether the road on which the moving object moves is the road having no center divider based on the image information or the road information, and determine that the type of the road on which the moving object moves corresponds to the type of road stored in the table when the road has a center divider and the moving object information recorded in the memory indicates the four or more-wheel vehicle.

7. The information acquisition apparatus according to claim 1, wherein the one or more processors execute the computer-executable instructions to cause the information acquisition apparatus to determine the speed limit for the road on which the moving object moves based on the image information or the road information, and determine that the type of the road on which the moving object moves corresponds to the type of road stored in the table when the road has the maximum speed larger than the predetermined speed and the moving object information recorded in the memory indicates the four or more-wheel vehicle.

8. An information acquisition apparatus provided in a moving object that moves on a road, the information acquisition apparatus comprising: a memory; and one or more processors that execute computer-executable instructions stored in the memory, wherein the memory is configured to record therein a table storing types of roads in association with types of moving objects, moving object information indicating a type of the moving object, and at least one of a predetermined threshold, by which roads are classified into a narrow road and a wide road, and a predetermined speed threshold, with which roads are classified, in the table, the narrow road, a road without a center divider, or a road having a maximum speed smaller than the predetermined speed threshold is associated with a two-wheel vehicle, and the wide road, a road with the center divider, or a road having a maximum speed larger than the predetermined speed threshold is associated with a four-wheel vehicle, and the one or more processors execute the computer-executable instructions to cause the information acquisition apparatus to:

determine a type of the road on which the moving object moves based on image information acquired by a camera installed in the moving object and indicating images of surroundings of the moving object, or on road information indicating a position of the moving object based on map information;

determine whether the type of the road as determined corresponds to a type of road stored in the table in association with the type of the moving object based on the moving object information;

add identification information to the image information when it is determined that the type of the road corresponds to the type of road stored in the table, and record the image information with the identification information in the memory, identify the image information with the identification information among the image information recorded in the memory as information that should be transmitted to a server provided outside the moving object; and transmit the image information with the identification information to the server.

9. The information acquisition apparatus according to claim 8, wherein the one or more processors execute the computer-executable instructions to cause the information acquisition apparatus to determine a width of the road based on the image information or the road information, and determine that the type of the road corresponds to the type of road stored in the table when the width of the road is classified into the narrow road using the predetermined threshold and the moving object information recorded in the memory indicates the two-wheel vehicle.

10. The information acquisition apparatus according to claim 8, wherein the one or more processors execute the computer-executable instructions to cause the information acquisition apparatus to determine whether the road on which the moving object moves is the road having no center divider based on the image information or the road information, and determine that the type of the road on which the moving object moves corresponds to the type of road stored in the table when the road does not have a center divider and the moving object information recorded in the memory indicates the two-wheel vehicle.

11. The information acquisition apparatus according to claim 8, wherein the one or more processors execute the computer-executable instructions to cause the information acquisition apparatus to determine the speed limit for the road on which the moving object moves based on the image information or the road information, and determine that the type of the road on which the moving object moves corresponds to the type of road stored in the table when the road has the maximum speed smaller than the predetermined speed and the moving object information recorded in the memory indicates the two-wheel vehicle.

12. The information acquisition apparatus according to claim 8, wherein the one or more processors execute the computer-executable instructions to cause the information acquisition apparatus to determine a width of the road based on the image information or the road information, and determine that the type of the road corresponds to the type of road stored in the table when the width of the road is classified into the wide road using the predetermined threshold and the moving object information recorded in the memory indicates the four or more-wheel vehicle.

13. The information acquisition apparatus according to claim 8, wherein the one or more processors execute the computer-executable instructions to cause the information acquisition apparatus to determine whether the road on which the moving object moves is the road having no center divider based on the image information or the road information, and determine that the type of the road on which the moving object moves corresponds to the type of road stored in the table when the road has a center divider and the moving object information recorded in the memory indicates the four or more-wheel vehicle.

14. The information acquisition apparatus according to claim 8, wherein the one or more processors execute the computer-executable instructions to cause the information acquisition apparatus to determine the speed limit for the road on which the moving object moves based on the image information or the road information, and determine that the type of the road on which the moving object moves corresponds to the type of road stored in the table when the road has the maximum speed larger than the predetermined speed and the moving object information recorded in the memory indicates the four or more-wheel vehicle.

* * * * *